United States Patent [19]
Cox

[11] Patent Number: 6,126,985
[45] Date of Patent: Oct. 3, 2000

[54] METHOD, APPARATUS AND COMPOSITION FOR TREATING A BALE OF HAY

[75] Inventor: Thomas Dudley Cox, Ellijay, Ga.

[73] Assignees: Robert A. Stokes; Linda D. Stokes, both of Atlanta, Ga.

[21] Appl. No.: 09/130,015

[22] Filed: Aug. 6, 1998

[51] Int. Cl.$^7$ ...................................................... A23K 1/00
[52] U.S. Cl. .................................. 426/636; 426/2; 426/73; 426/74; 426/576; 426/601; 426/615; 426/636; 426/639; 426/807
[58] Field of Search ..................................... 426/615, 636, 426/2, 639, 73, 74, 576, 807, 601

[56] References Cited

U.S. PATENT DOCUMENTS

| | | |
|---|---|---|
| 989,478 | 4/1911 | Bertels . |
| 1,196,138 | 8/1916 | Muller . |
| 2,646,384 | 7/1953 | Rakieten ................................ 426/807 |
| 4,185,549 | 1/1980 | Roepnack . |
| 4,223,045 | 9/1980 | Fink . |
| 4,225,620 | 9/1980 | Rawlings et al. . |
| 4,450,178 | 5/1984 | Korsgaard . |
| 4,606,172 | 8/1986 | Miller . |
| 4,674,786 | 6/1987 | Lynch . |
| 5,156,870 | 10/1992 | Evans ..................................... 426/807 |
| 5,178,505 | 1/1993 | Smith . |
| 5,250,307 | 10/1993 | Cummings et al. ..................... 426/807 |
| 5,789,072 | 8/1998 | Ulrich ..................................... 426/807 |

Primary Examiner—Helen Pratt
Attorney, Agent, or Firm—Chambliss, Bahner & Stophel, P.C.

[57] ABSTRACT

The invention includes a composition, method and apparatus for use in treating a bale of hay. The composition is essentially free of ammonia, urea and lye, and contains about 10% to about 50% by volume sweetener, about 0.5% to about 8% by volume liquid fat, about 0.5% to about 10% by volume gelatin, at least about 0.2% by volume phosphoric acid, at least about 0.3% by volume elemental calcium, at least about 500 IU Vitamin A per gallon of composition, at least about 100 IU Vitamin D per gallon of composition, and water. The method includes injecting this composition into a bale of hay. A concentrate is also provided that may be mixed with water to form the liquid composition, which concentrate is essentially free of ammonia, urea and lye, and contains about 30% to about 85% by volume sweetener, about 1.5% to about 40% by volume liquid fat, about 1.5% to about 40% by volume gelatin, at least about 1% by volume phosphoric acid, at least about 1.5% by volume elemental calcium, at least about 2500 IU Vitamin A per gallon of concentrate and at least about 500 IU Vitamin D per gallon of concentrate.

14 Claims, 9 Drawing Sheets

METHOD, APPARATUS AND COMPOSITION FOR TREATING A BALE OF HAY

FIELD OF THE INVENTION

This invention relates generally to the treatment of hay to improve its nutritional content and render it more palatable to ruminants. More particularly, the invention provides a method, apparatus and composition for the treatment of old or aged hay so that it will be immediately useful.

BACKGROUND AND DESCRIPTION OF THE PRIOR ART

Hay treatments and supplements for feeding ruminants such as cattle generally are designed to improve the nutritional content of the hay, especially of hay that has been stored for a time, or to provide a liquid or particulate feed supplement that may be made available in a feeding trough or lickwheel or applied as a top dressing to grains or other roughage.

Beef and dairy cows will naturally feed on grass when it is available. However, it is common for owners of cows to cut and bale hay, or to purchase it, for use during the fall and winter months, when grass is sparse or unavailable. Because of the difficulty in accurately predicting weather conditions more than a few days in advance, it is frequently impossible to estimate the amount of hay that will be necessary to feed the cows in a particular pasture until new grass emerges in the spring. However, hay that is not used during the season following its cutting and baling will generally lose a considerable portion of its nutritional content, including as much as 33% of its protein, when compared to fresh hay. In addition, old or aged hay is frequently more difficult for the cows to digest. Furthermore, fresh hay will also taste better to the cows, which will result in the fresher hay being preferred whenever cows have a choice. Under such circumstances, an owner may find that hay that is not consumed during the fall and winter after it has been cut and baled will not be consumed thereafter and will therefore be wasted.

Most known treatments for hay, especially old or aged hay, are designed to add ammonia, urea or lye to pre-digest the hay in order to make it easier for cows to digest. Such treatments generally require that ammonia, urea or lye be injected into or sprayed onto a bale of hay, and the bale wrapped in plastic or other impervious material for up to six weeks while the pre-digestion process takes place. Thus for example, U.S. Pat. No. 4,606,172 of Miller describes a method and apparatus for wrapping a bale of hay and injecting it with ammonia. The apparatus includes a turntable with a plurality of spikes on which the bale may be impaled and an adjacent roll holder for holding a roll of plastic or other wrapping material. The turntable is rotated while the wrapping material is wrapped around the bale, and ammonia is pumped from a storage tank through the central spike on the turntable into the bale. While the apparatus of Miller may be mounted to the three-point hitch of a tractor, other mechanisms are known for use in treating a bale of hay while it is being transported. U.S. Pat. No. 4,450,178 of Korsgaard describes a method and apparatus for treating hay bales with ammonia or another lye agent. The apparatus comprises a tractor that is provided with a rear-mounted ammonia tank and a front hay-loader having a frame to which are attached a plurality of spears and an ammonia distributor. Each of the spears is provided with an external injector pipe which is connected by a hose to the ammonia source. A bale of hay is impaled on the front hay-loader and ammonia or lye is injected through the injector pipes into the bale as the tractor is being used to transport the bale. Although ammonia, lye and urea may be used to pre-digest aged hay so as to make it easier for cows to consume, the hay must be treated for several weeks before it may be used, and even then, its palatability is not significantly improved. Hay that is treated with ammonia or lye cannot therefore be consumed immediately after treatment. Furthermore, ammonia and lye and treatments containing such components are quite caustic and consequently hazardous to store and handle.

It is also known to treat hay and other animal feeds with supplements of various types. Thus, for example, U.S. Pat. No. 1,196,138 of Muller describes a method and apparatus for impregnating baled alfalfa with molasses by placing the bale in a casing and inserting a distributing pipe into the bale. Molasses is then pumped through the pipe and into the bale. This method may make aged hay more palatable, but it will not significantly increase its nutritional value.

It is also known to provide nutrition-enhancing cattle feed supplements of various types. U.S. Pat. No. 989,478 of Bertels describes a meal-based cattle feed supplement containing a food component such as ground meals of hay and oats, a vegetable oil component such as linseed oil, and molasses. U.S. Pat. No. 4,225,620 of Rawlings et al. describes a method for preparing a particulate feed supplement that may be added to forage cellulose for ruminants. This supplement is derived from animal or vegetable protein sources such as soymeal, bone meal, blood meal, blood and milk whey. It is dissolved in water (unless it is already in a water-based liquid form) and its pH is adjusted with an alkaline agent such as alkali metal hydroxides and alkaline earth metal hydroxides to a level within the range of about 9 to about 13.5. The solution is then dried to form a particulate feed supplement.

Liquid feed supplements are also available for use in lickwheel feeders and as top dressings for grain. PM Ag Products Incorporated of Homewood, Ill. supplies a liquid supplement, sold under the trademark PRO-LIX, which contains cane molasses (which has been processed to remove sugars), urea, condensed fermented corn extractives, condensed molasses fermentation solubles, feed grade fat, phosphoric acid, ammonium polyphosphate, sulfuric acid, zinc sulfate, manganese sulfate, ferrous sulfate, copper sulfate, vitamin A acetate, magnesium sulfate, D-activated animal sterol, sodium selenite, ethylenediamine dihydriodide, vitamin E acetate and cobalt sulfate.

Particulate and grain based supplements may provide enhanced nutritional value, but they can be expensive to obtain. Furthermore, it can be difficult to insure that these supplements, as well as the liquid supplements, are available to all of the cows in a herd. Supplemental rations are usually provided in feed troughs and lickwheels, and when the troughs or lickwheels are filled, it is common for the larger and more aggressive animals to push the smaller and more docile animals away in order to consume more than their share of the supplement, resulting in an imbalance in the nutrition provided across the herd.

It would be desirable if a method and composition could be provided that could be used to improve the nutritional content of hay and make it more palatable to cows. It would also be desirable if this method and composition could be employed to rejuvenate old or aged hay. Finally, it would be desirable if an apparatus could be provided that would provide for easy and quick treatment of the hay.

OBJECTS AND ADVANTAGES OF THE INVENTION

Accordingly, it is an object of the invention claimed herein to provide a method and composition that may be used to improve the nutritional content of hay and make it more palatable to cows, so that all of the cows in a herd will have access to a nutritional and palatable food source without their owner's having to rely on use of a lickwheel or on supplying other feed supplements. It is another object of the invention to provide such a method and composition that can be employed to rejuvenate old or aged hay so that the hay may be consumed immediately thereafter. It is yet another object of the invention to provide an apparatus that may be used to treat a bale of hay while it is being transported.

Additional objects and advantages of this invention will become apparent from an examination of the drawings and the ensuing description.

EXPLANATION OF TECHNICAL TERMS

As used herein, hay refers to grasses of various sorts, including alfalfa, clover and the like, that are cut and dried for use as animal feed.

As used herein, a bale of hay refers to a quantity of hay that has been compressed, rolled, baled or otherwise agglomerated into a mass of any size and shape.

As used herein, old or aged hay refers to hay that has not yet been used or consumed during the winter season following its cutting and baling.

As used herein, rejuvenated hay is old or aged hay that has been treated according to the invention to improve its nutritional content and its palatability to cows.

As used herein, an aqueous solution includes homogeneous mixtures, blends, suspensions and dispersions containing water.

As used herein, sweetener refers to sugars in various forms, including both monosaccharides and disaccharides and derivatives therefrom, and mixtures and aqueous solutions thereof. Representative sweeteners include glucose, fructose, dextrose, corn syrup, high-fructose corn syrup, lactose, maltose, sucrose, invert sugar, and molasses that has not been processed to remove sugars.

As used herein, non-molasses sweetener refers to sweetener that does not include molasses.

As used herein, chlorophyll refers to the green pigment found in the chloroplasts of plant cells that is involved in photosynthesis. Chlorophyll includes both chlorophyll a ($C_{55}H_{72}MgN_4O_5$) and chlorophyll b ($C_{55}H_{70}MgN_4O_6$).

SUMMARY OF THE INVENTION

The invention comprises a composition, method and apparatus for use in treating a bale of hay. The composition is essentially free of ammonia, urea and lye, and contains about 10% to about 65% by volume sweetener, about 0.5% to about 8% by volume liquid fat, about 0.5% to about 10% by volume gelatin, at least about 0.2% by volume phosphoric acid, at least about 0.3% by volume elemental calcium, at least about 500 IU Vitamin A per gallon of composition, at least about 100 IU Vitamin D per gallon of composition, and water. The method includes injecting this composition into a bale of hay. The invention also includes an apparatus for use in carrying out the method, which apparatus includes at least one hollow shaft that is adapted for insertion into a bale of hay, which shaft is provided with a plurality of holes along its length. The apparatus also includes a reservoir for containing a quantity of the composition, piping for providing a fluid connection between the reservoir and the hollow shaft, and a pump for pumping the composition from the reservoir through the hollow shaft for dispersal through the holes along the length thereof. A concentrate is also provided that may be mixed with water to form the liquid composition, which concentrate is essentially free of ammonia, urea and lye, and contains about 30% to about 85% by volume sweetener, about 1.5% to about 40% by volume liquid fat, about 1.5% to about 40% by volume gelatin, at least about 1% by volume phosphoric acid, at least about 1.5% by volume elemental calcium, at least about 2500 IU Vitamin A per gallon of concentrate and at least about 500 IU Vitamin D per gallon of concentrate.

In order to facilitate an understanding of the invention, the preferred embodiments of the invention are illustrated in the drawings, and a detailed description thereof follows. It is not intended, however, that the invention be limited to the particular embodiments described or to use in connection with the apparatus illustrated herein. Various modifications and alternative embodiments such as would ordinarily occur to one skilled in the art to which the invention relates are also contemplated and included within the scope of the invention described and claimed herein.

BRIEF DESCRIPTION OF THE DRAWINGS

The presently preferred embodiments of the invention are illustrated in the accompanying drawings, in which like reference numerals represent like parts throughout, and in which.

DESCRIPTION OF THE PREFERRED EMBODIMENTS OF THE INVENTION

Figure 1:
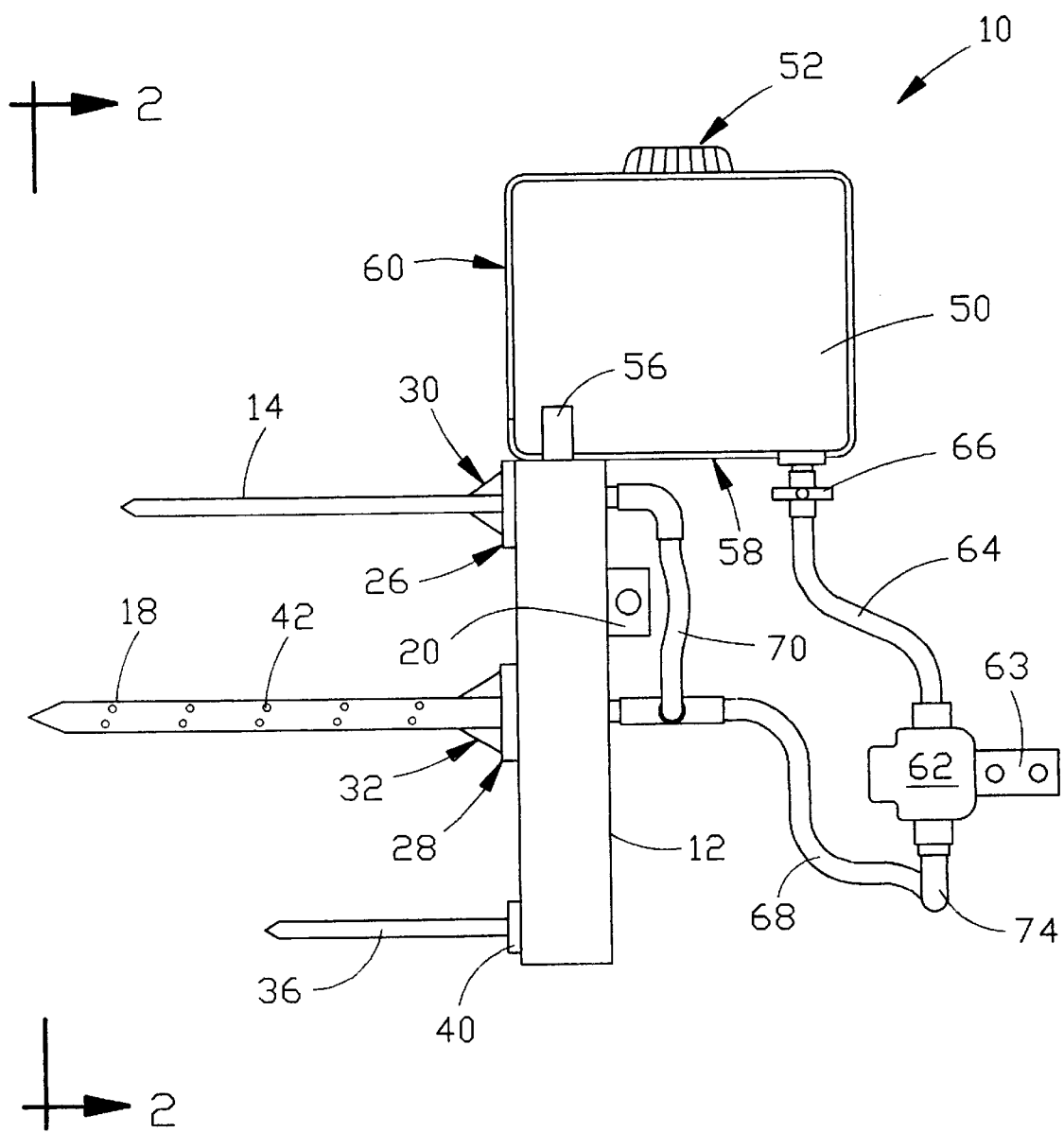
FIG. 1 is a side view of a first embodiment of an apparatus for use in treating a bale of hay according to the invention.

The invention includes a composition that may be used to treat a bale of hay. This composition is essentially free of ammonia, urea and lye. Consequently, it may be employed to rejuvenate an aged bale of hay in such a way that it may be immediately consumed by cows. In addition, it will be palatable to the cows. Experiments have shown that cows will prefer an aged bale of hay that has been treated with the composition of the invention to a fresh, untreated bale.

The composition is an aqueous solution that is essentially free of ammonia, urea and lye and which contains about 10% to about 50% by volume sweetener. Preferably, the composition includes about 20 to about 25% by volume unprocessed cane molasses (cane molasses that has not been processed to remove sugars) or corn syrup. The composition also includes about 0.5% to about 8% by volume liquid fat and about 0.5% to about 10% by volume gelatin. Preferably, about 3% by volume of each of liquid fat and gelatin are provided in the composition. The gelatin adds protein and serves as a clinging agent to facilitate the composition's clinging to the stalks of the hay. The composition also includes at least about 0.2% by volume phosphoric acid and at least about 0.3% by volume elemental calcium. It is also preferred that the ratio of phosphoric acid to elemental calcium by volume be maintained at about 2:3. At least about 500 IU Vitamin A per gallon of composition, and preferably at least about 2000 IU per gallon, is also provided. In addition, the composition contains at least about 100 IU Vitamin D per gallon of composition, preferably at least about 400 IU per gallon.

The preferred composition also includes about 1% to about 10%, and preferably about 5%, by volume condensed cane molasses fermentation solubles, and at least about 60% by volume water. The composition may also contain scenting and/or flavoring agents that may make the treated bale of hay more attractive and palatable to the cows. Thus, for example, the composition may contain about 5% to about 10% by volume chlorophyll, which will simulate the scent and flavoring of freshly cut grasses. If chlorophyll is included in the composition, it is preferred that a non-molasses sweetener be used, preferably corn syrup or high-fructose corn syrup, primarily because molasses has a strong scent that will diminish the effect of the chlorophyll. If chlorophyll is included in the composition, it is also preferred that the amount of vitamin A in the composition be at least about 1000 IU per gallon, since a combination of vitamin A and chlorophyll will enhance the "grass-like" flavor of the composition. If chlorophyll is not included in the composition, unprocessed cane molasses, or cane molasses that has not been processed to remove sugars, is the preferred sweetener. Other scenting and/or flavoring agents may also be employed in the composition to make the treated hay more palatable to cows.

A concentrate is also provided that may be mixed with water to form the liquid composition, which concentrate is essentially free of ammonia, urea and lye, and contains about 30% to about 85% by volume sweetener, about 1.5% to about 40% by volume liquid fat, about 1.5% to about 40% by volume gelatin, at least about 1% by volume phosphoric acid, at least about 1.5% by volume elemental calcium, at least about 2500 IU Vitamin A per gallon of concentrate and at least about 500 IU Vitamin D per gallon of concentrate. Preferably, the concentrate also includes about 3% to about 35% by volume condensed cane molasses fermentation solubles. The concentrate may also include about 15% to about 40% chlorophyll, and at least about 4000 IU Vitamin A per gallon of concentrate, which will simulate the scent and flavoring of freshly cut grasses.

The method includes injecting the aqueous solution comprising the composition into a bale of hay, preferably at a rate within the range of about 0.05 to about 0.25 gallons of composition per 100 pounds of hay. The invention also includes an apparatus for use in carrying out the method, three embodiments of which are illustrated in the drawings.

Referring now to FIGS. 1 through 4, apparatus 10 includes frame 12 to which are attached hollow shafts 14, 16 and 18. The shafts are adapted to be inserted into a bale of hay and to support the bale while apparatus 10 is used to transport it from a storage facility to a pasture for feeding. The shafts also permit distribution of the composition of the invention into the bale while it is being moved, as will be subsequently explained. Apparatus 10 is particularly suited for use in connection with cylindrically-shaped bales, although it may also be used with other shaped bales as well.

Frame 12 is preferably comprised of square pipes that are welded together in the configuration shown or in any other suitable arrangement. The frame is preferably adapted to be mounted to the three point hitch of a tractor (not shown) by means of mounting brackets 20, 22 and 24, which are welded into place and provided with holes that are sized appropriately for use in mounting with bolts (also not shown) to support the weight of the apparatus.

Figure 2:
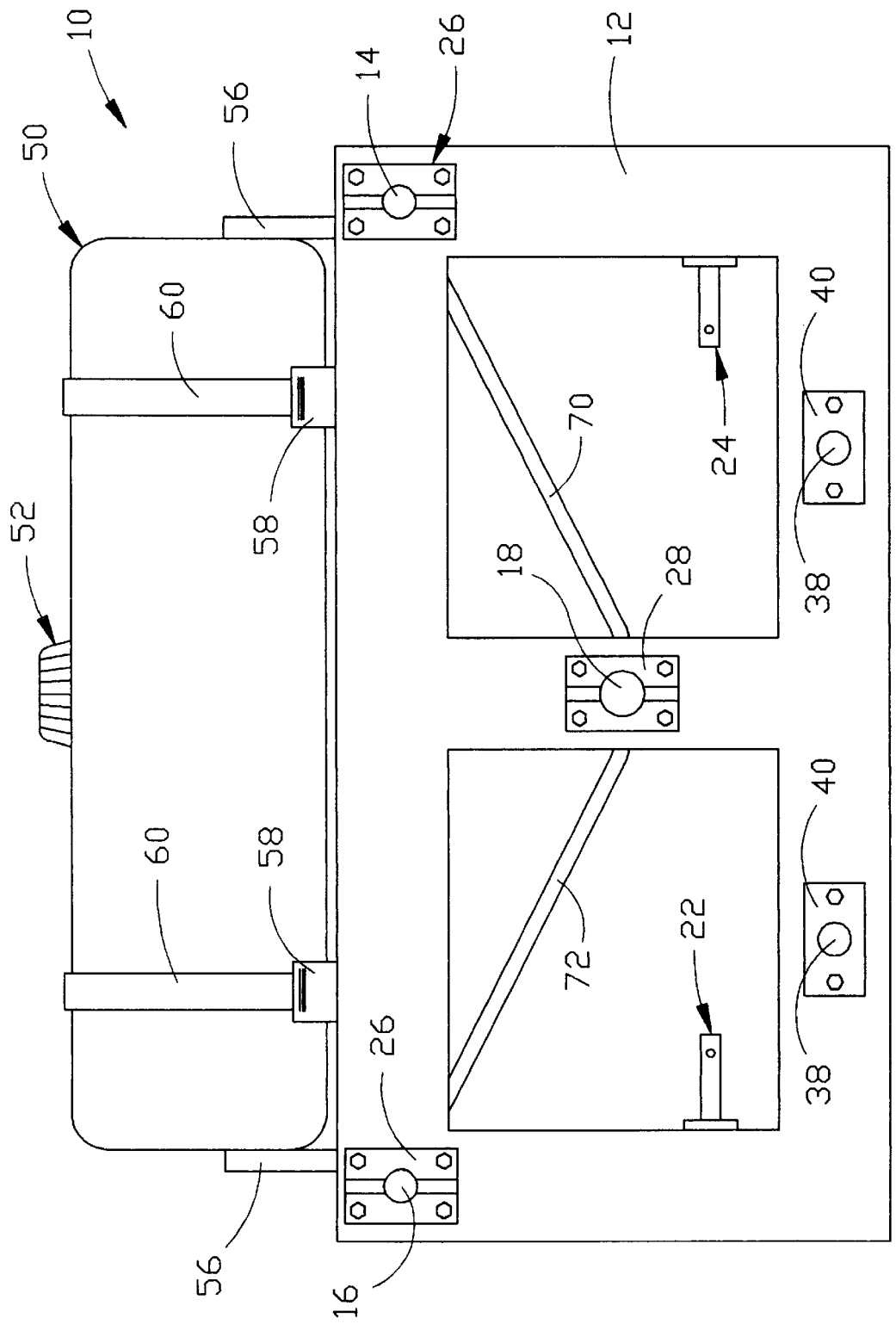
FIG. 2 is a front view of the apparatus of FIG. 1, taken along the line 2—2 of FIG. 1.
Figure 3:
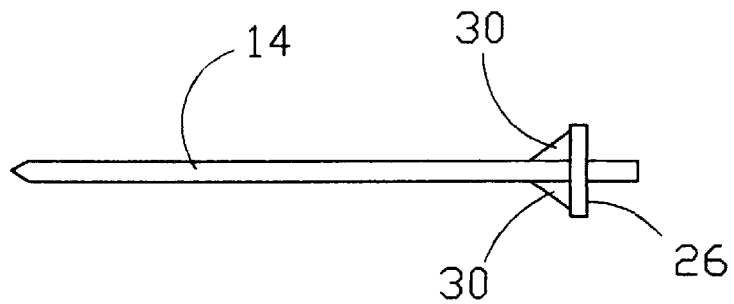
FIG. 3 is a side view of a portion of the apparatus of FIG. 1.
Figure 4:
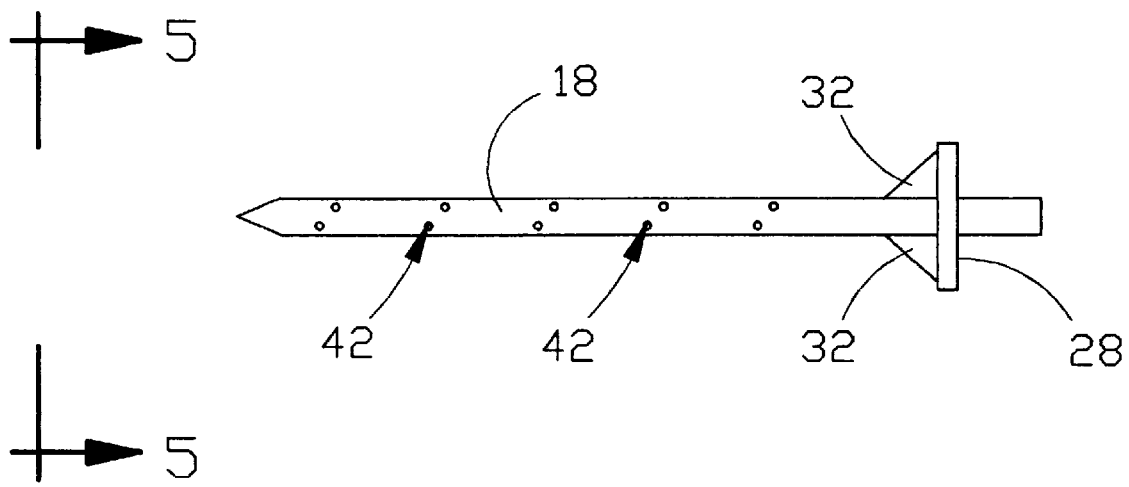
FIG. 4 is a side view of a portion of the apparatus of FIG. 1.
Figure 5:
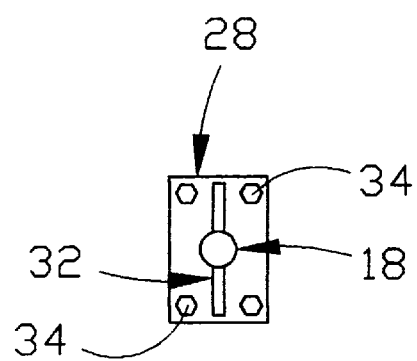
FIG. 5 is a front view of the portion of the apparatus of FIG. 4, taken along the line 5—5 of FIG. 4.

At least one hollow shaft is provided for distribution of the composition into the bale. Preferably, at least two shafts are provided which are spaced apart in order to provide support for the bale and to achieve an appropriate distribution of composition into the bale. As shown in FIGS. 1 and 2, apparatus 10 includes three hollow shafts, 14, 16 and 18, two of which (14 and 16) are located at opposite sides of the frame, and one of which (18) is located at the approximate center thereof. Shafts 14, 16 and 18 are mounted to the frame, preferably by means of brackets 26 and 28 (see FIGS. 2 through 5), which are provided with gussets 30 and 32 for strength and stability. The shafts may be welded or otherwise mounted onto the frame or onto the brackets. Preferably, the shafts are fitted through holes (not shown) in frame 12 and welded to the brackets, which brackets are then bolted onto the frame by means of bolts 34. Bale stabilizers or hay hooks 36 and 38, which are sized and located so as to be capable of being inserted into the bale for additional support, may also be welded or otherwise attached to the frame or to brackets 40 (which may then be bolted to the frame). In the alternative, hay hooks 36 and 38 may be replaced with a pair of additional hollow shafts similar to shafts 14 and 16.

Shafts 14, 16 and 18 are adapted for insertion into a bale of hay. The hollow shafts are preferably provided with tapered ends for ease of insertion into the bale, which ends are blunted to reduce the risk of injuring a cow in the pasture. Although the hollow shafts may be provided in any convenient length and diameter, it is preferred that shaft 18 is about forty-eight inches long, has a diameter of about two inches, and is tapered at its outer end. It is generally not considered necessary for shafts 14 and 16 to be as massive as central shaft 18. Therefore, shafts 14 and 16 are preferably about forty inches long and are tapered in a similar fashion as is shaft 18, but have a diameter of about one inch. Preferably, shafts 14, 16 and 18 are made from stainless steel and are provided with internal threads (not shown) at the end which is fitted into the frame for attachment of couplings which are provided for purposes to be subsequently explained.

Figure 6:
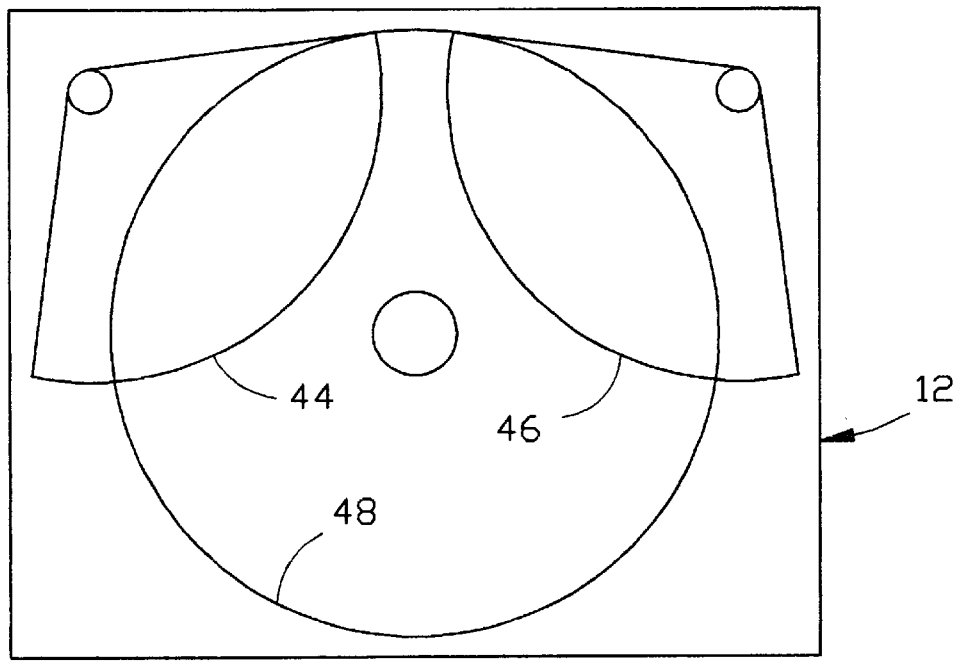
FIG. 6 is a front schematic view of a portion of the apparatus of FIGS. 1 through 5, showing a preferred distribution pattern for a treatment composition that may be obtained by a use of the embodiment of FIGS. 1 through 5.
Figure 9:
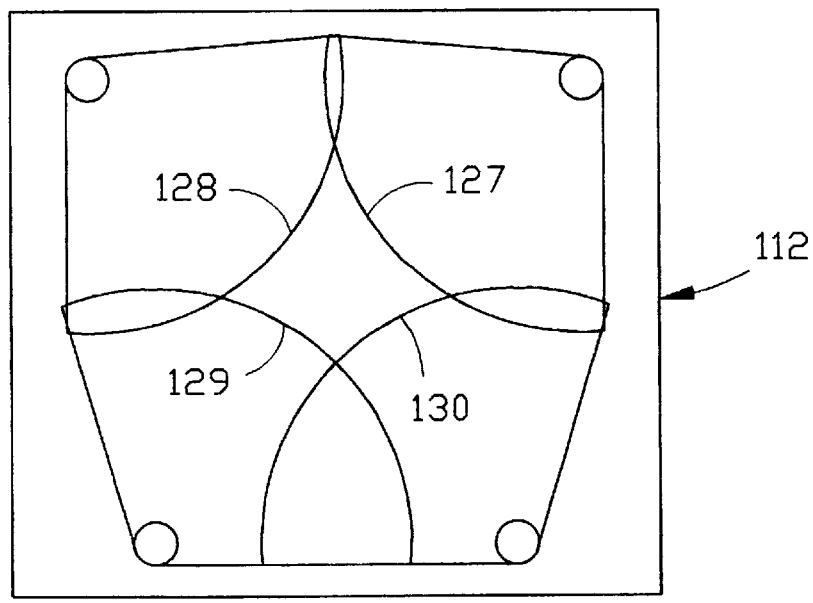
FIG. 9 is a front schematic view of a portion of the apparatus of FIGS. 7 and 8, showing a preferred distribution pattern for a treatment composition that may be obtained by a use of the embodiment of FIGS. 7 and 8.

Each shaft is provided with a plurality of holes 42 along its length. Preferably, no holes are provided within the first foot of length of the shaft from the frame, in order to insure that the composition is distributed through the holes so as to be retained in the bale. Otherwise, the holes are located and spaced so as to achieve the desired pattern for distribution of the composition into a bale. A preferred distribution pattern for apparatus 10, indicated by arc 44 (showing the distribution pattern from shaft 16), arc 46 (showing the distribution pattern from shaft 14) and arc 48 (showing the distribution pattern from shaft 18), is illustrated in FIG. 6. As shown therein, the preferred distribution pattern from central shaft 18, that is located so as to pierce the approximate center of the bale, is generally bounded by a cylinder with its long axis coincident with the long axis of the shaft. The preferred distribution pattern from each of side shafts 14 and 16 is generally towards the center of the bale and overlapping that of the center shaft. Preferably, each of the side shafts has its holes arranged so as to distribute the liquid composition within the bale of hay in a distribution pattern that is generally bounded by an arc that is centered on the long axis of the shaft, which arc has a length of at least about 135° to about 225°.

It is preferred that the number and size of the holes be designed to accommodate a total flow rate of liquid composition into the bale of no more than five gallons per minute, and preferably about two to about five gallons per minute. Although the rate of flow of composition into the bale will depend on how tightly the hay is baled, a flow rate within the aforementioned range will most likely be achieved, for example, if shaft 18 is provided with at least 20, and preferably 28 holes, each having a diameter of about 1/16 inch, and each of shafts 14 and 16 are provided with at least 20, and preferably 22 holes of the same size.

Reservoir 50 is mounted atop frame 12 and is adapted to hold a suitable quantity, such as fifty gallons, of the composition. Preferably, the reservoir is made from plastic or other suitable material, and is provided with fill cap 52 with a vent (not shown). Reservoir 50 is also preferably mounted within side supports 56 and atop base supports 58 and secured to base supports 58 by straps 60. Reservoir 50 is in fluid communication with pump 62 through a piping 64 that extends from the bottom of the reservoir to the pump. Preferably pump 62 is a power-take-off driven roller pump, which may be attached to the power-take-off of a tractor or other vehicle for power, in a manner known to those having ordinary skill in the art to which the invention relates. In the alternative, the pump may be powered by an electric motor (not shown) or by other known means. The pump may be mounted on the frame or on a tractor or other vehicle by means of bracket 63.

Preferably, flow regulator or valve 66 is provided in piping 64 in order to provide control for the flow of the liquid composition from the reservoir. In addition, it is preferred that reservoir 50 be provided with an internal filter (not shown) to filter the liquid composition passing into piping 64. Pipings 64, 68, 70 and 72, preferably made of rubber or neoprene, are adapted to provide a fluid connection between the reservoir, through pump 62, and the hollow shafts. It is also preferred that externally threaded elbow couplings (such as elbow 74) are provided for attachment to threaded shafts 14 and 16, and that externally threaded junction coupling 76 is provided for attachment to internally threaded shaft 18. Hose 68 may then be attached by means of a hose clamp or other suitable means to junction coupling 76, and hoses 70 and 72 may be similarly attached at one end to an elbow coupling and at the other to the junction coupling to complete the fluid connection. By means of this fluid connection, pump 62 is adapted to pump the composition from the reservoir through the hollow shafts for dispersal through the holes along the length thereof.

Apparatus 10 is also preferably provided with check valve 74 that is adapted to prevent flow of the composition into the shafts when the pump is not engaged. In addition, other suitable couplings, controls, fittings, seals and drains as are deemed desirable may also be provided in the assembly of apparatus 10.

As has been mentioned, apparatus 10 is adapted for attachment to the three point hitch at the rear of a tractor. Apparatus 110, illustrated in FIGS. 7 and 8, is another embodiment of the invention that is adapted for attachment on a conventional hay hook (shown in phantom at 180) at the front of a tractor or other suitable item of equipment. Apparatus 110 includes frame 112 which is provided with a hole at 113 to permit insertion of the hay hook therethrough. Apparatus 110 is provided with sleeve 182 that is adapted to fit over the hay hook, which sleeve is provided with a plurality of locking bolts 184 to secure it over the hook. In addition, straps 186 may be provided to further secure apparatus 110 to the frame of the conventional hay hook. Apparatus 110, like apparatus 10, is particularly suited for use in connection with cylindrically-shaped bales.

At least one hollow shaft is provided for distribution of the composition into the bale. Preferably, at least four shafts are provided which are spaced apart in order to provide secondary support for the bale and to achieve an appropriate distribution of composition into the bale while it is being moved. As shown in FIGS. 7 and 8, apparatus 110 includes four hollow shafts, 114, 116, 117 and 118, two of which (114 and 116) are located at opposite sides of the frame near its top, and two of which (117 and 118) are located at opposite sides of the frame near its bottom. Shafts 114, 116, 117 and 118 are adapted to be inserted into a bale of hay and to support the bale while apparatus 110 is used to transport it from a storage facility to a pasture for feeding.

Hollow shafts 114, 116, 117 and 118 may be attached to frame 112 in a manner similar to that by which shafts 14, 16 and 18 are attached to frame 12 of apparatus 10. Frame 112 is preferably comprised of square pipes that are welded together in the configuration shown or in any other suitable arrangement. Hollow shafts 114, 116, 117 and 118 are preferably provided with tapered ends for ease of insertion into the bale, which ends are blunted to reduce the risk of injuring a cow in the pasture. Preferably, each of shafts 114, 116, 117 and 118 is identical to shafts 14 and 16. Preferably, shafts 114, 116, 117 and 118 are comprised of stainless steel, having a length of about forty inches, a diameter of about one inch, and are tapered at their outer ends. It is generally not considered necessary for shafts 114, 116, 117 and 118 to be as massive as central shaft 18 of apparatus 10, since hay hook 180 will provide most of the support for the bale of hay.

Each of shafts 114, 116, 117 and 118 is provided with a plurality of holes (not shown) along its length. Preferably, no holes are provided within the first foot of length of the shaft from the frame, in order to insure that the composition is distributed through the holes so as to be retained in the bale. Otherwise, the holes are spaced so as to achieve the desired pattern for distribution of the composition into a bale. A preferred distribution pattern for apparatus 110, indicated by arc 127 (showing the distribution pattern from shaft 114), arc 128 (showing the distribution pattern from shaft 116), arc 129 (showing the distribution pattern from shaft 117) and arc 130 (showing the distribution pattern from shaft 118), is illustrated in FIG. 9. As shown therein, the preferred distribution pattern from each of side shafts 114, 116, 117 and 118 is generally towards the center of the bale and overlapping that of the adjacent side shafts. Preferably, each of the side shafts has its holes arranged so as to distribute the liquid composition within the bale of hay in a distribution pattern that is generally bounded by an arc that is centered on the long axis of the shaft, which arc has a length of at least about 135° to about 225°.

It is preferred that the number and size of the holes be designed to accommodate a total flow rate of liquid composition into the bale of no more than five gallons per minute, and preferably about two to about five gallons per minute. Although the rate of flow of composition into the bale will depend on how tightly the hay is baled, a flow rate within the aforementioned range will most likely be achieved, for example, if each of shafts 114, 116, 117 and 118 is provided with at least 20, and preferably 22 holes, each having a diameter of about 1/16 inch.

Figure 7:
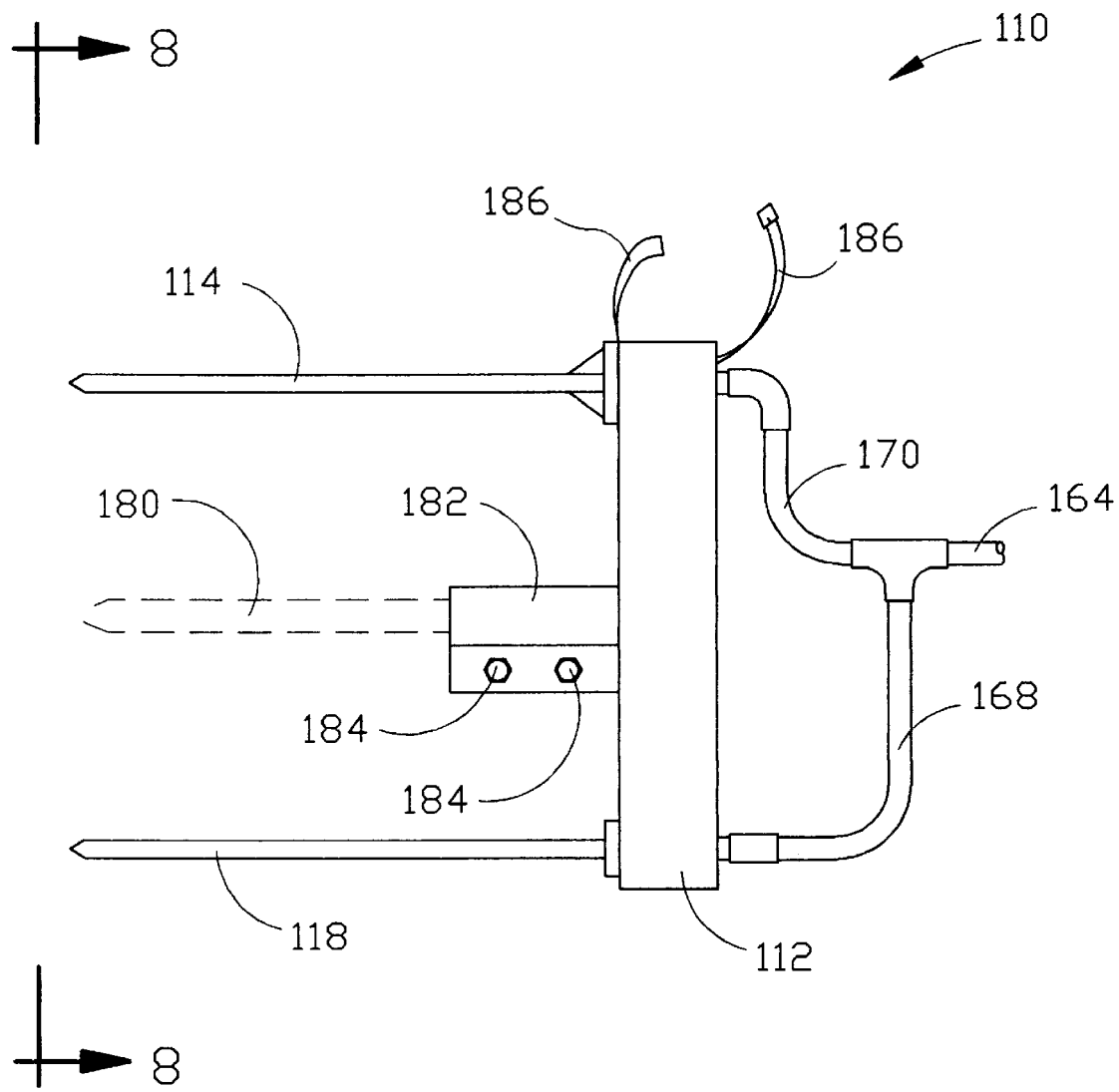
FIG. 7 is a side view of a second embodiment of an apparatus for use in treating a bale of hay according to the invention.
Figure 8:
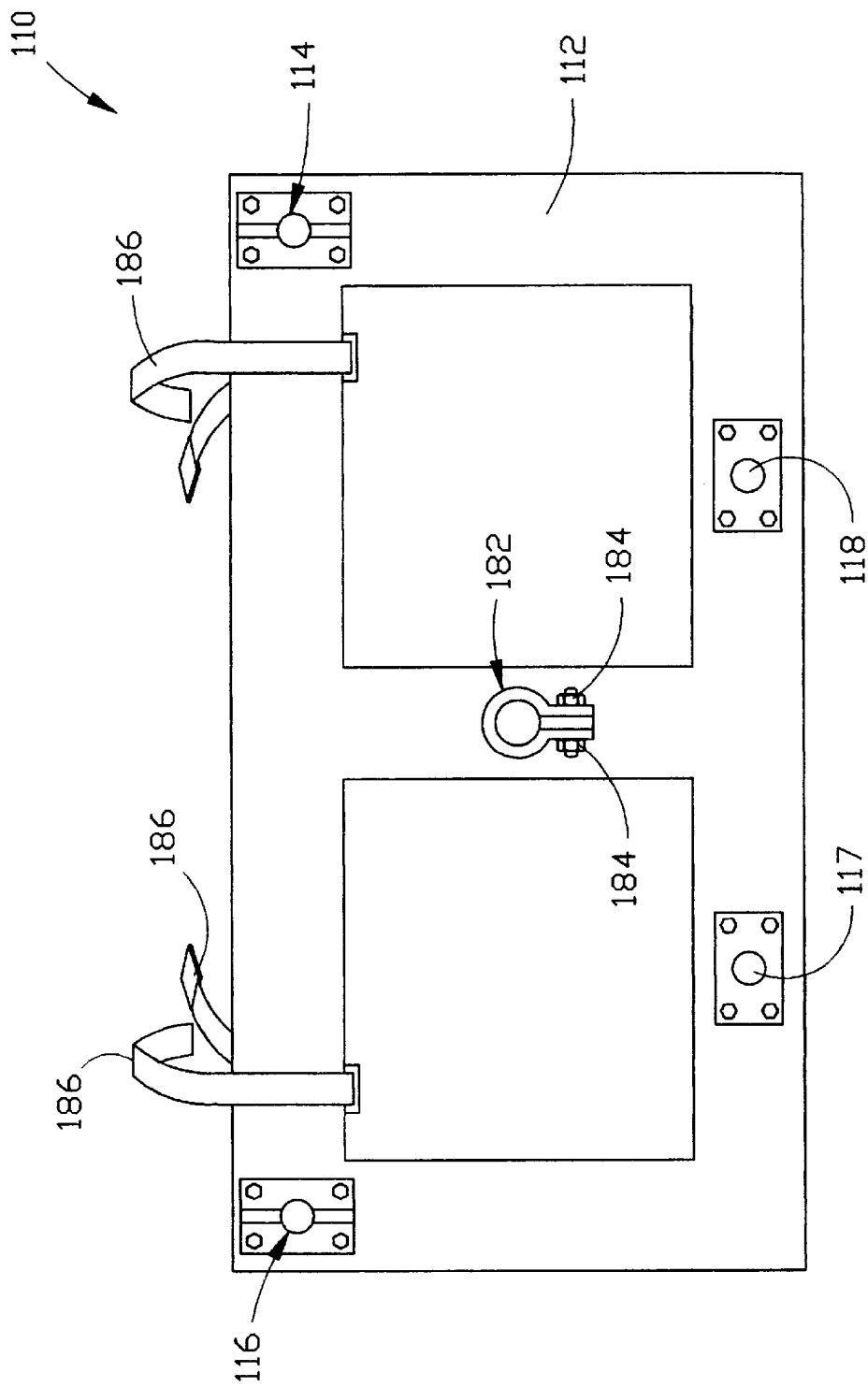
FIG. 8 is a front view of the apparatus of FIG. 7, taken along the line 8—8 of FIG. 7.

A reservoir (not shown) is also provided for use with apparatus 110, which reservoir is adapted to hold a suitable quantity of the composition. If apparatus 110 is used on the front end of a tractor or other item of equipment in conjunction with apparatus 10, which ismounted on the rear end, both apparatus 10 and apparatus 110 may, with a suitable piping arrangement, draw liquid composition from the same reservoir, such as reservoir 50 of apparatus 10. The reservoir must be provided with means for establishing fluid communication with a pump (also not shown), such as pump 62 of apparatus 10. Indeed, if apparatus 110 is used in conjunction with apparatus 10, pump 62 may be used, with suitable piping, to supply liquid composition both to apparatus 10 and to apparatus 110. In such case, pipings 164, 168 and 170 (see FIG. 7), preferably made of rubber or neoprene, may provide a portion of the fluid connection between the reservoir, through pump 62, and hollow shafts 114, 116, 117 and 118. Thus, pump 62 may be adapted for pumping the composition from the reservoir through the hollow shafts of apparatus 110 for dispersal through the holes along the length thereof.

Apparatus 110 is also preferably provided with a check valve (not shown) that is adapted to prevent flow of the composition into the shafts when the pump is not engaged. In addition, suitable couplings, controls, fittings, seals and drains as are deemed desirable may also be provided in the assembly of apparatus 110.

Figure 10:
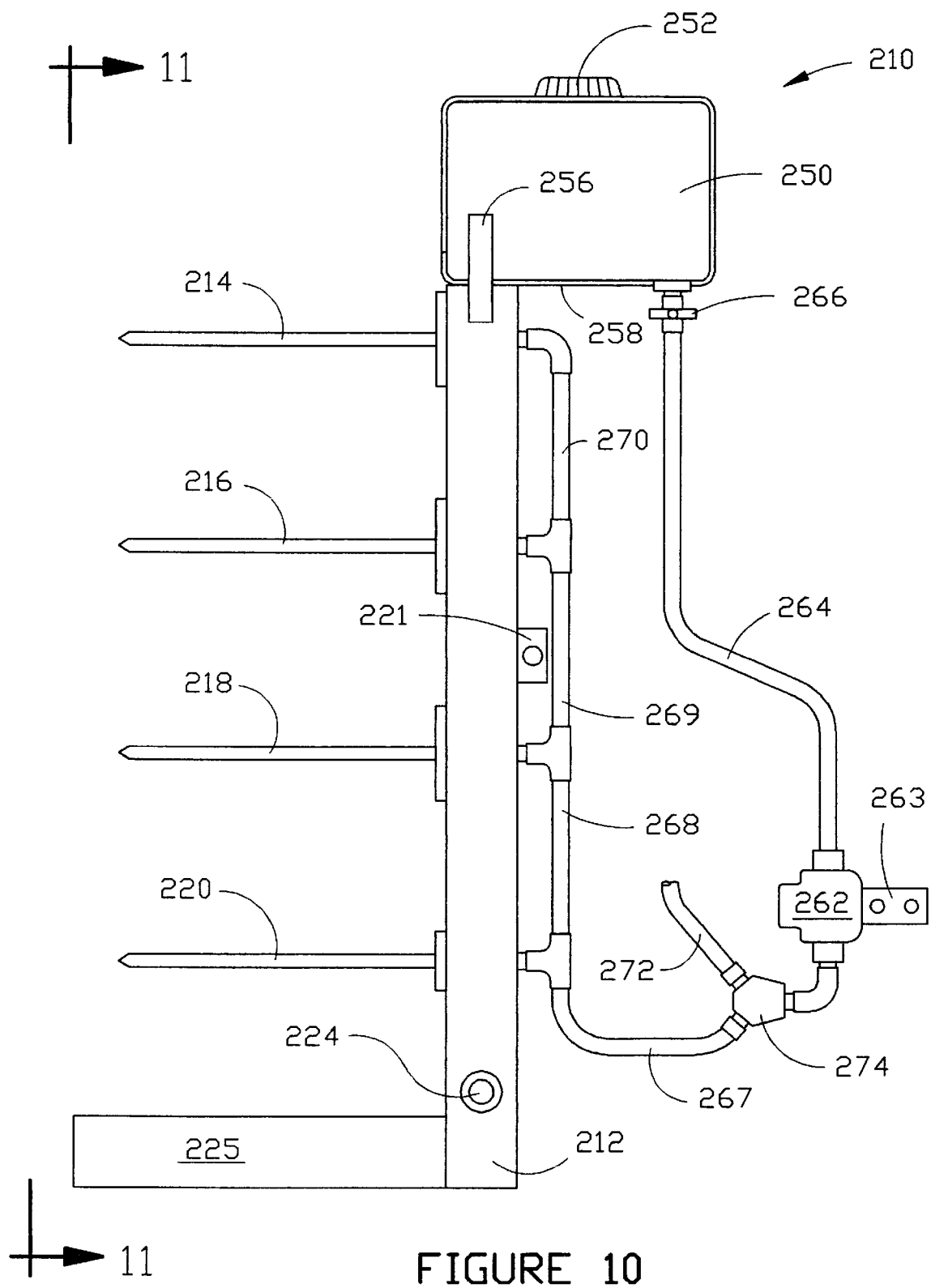
FIG. 10 is a side view of a third embodiment of an apparatus for use in treating one or more bales of hay according to the invention.
Figure 11:
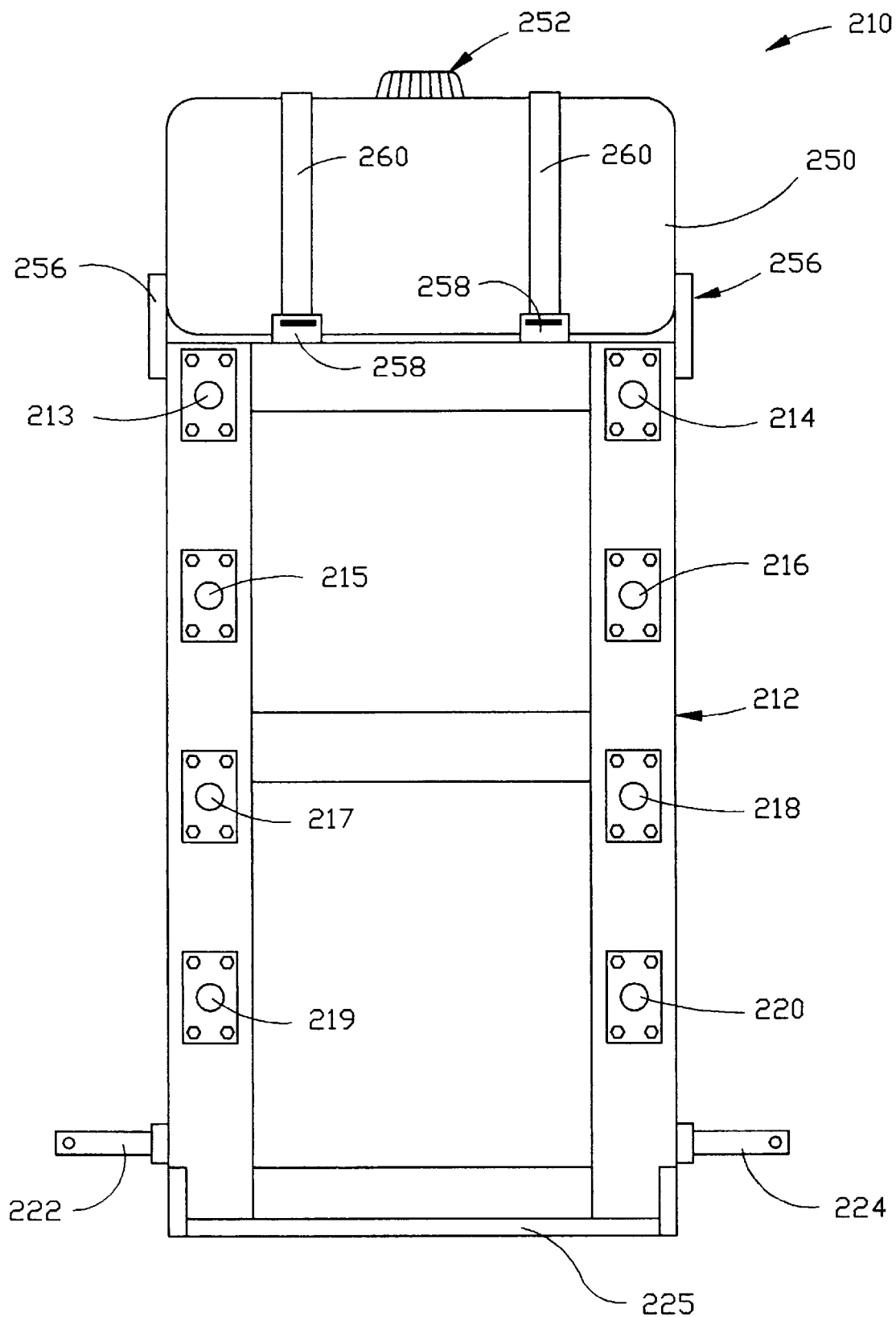
FIG. 11 is a front view of the apparatus of FIG. 10, taken along the line 11—11 of FIG. 10.
Figure 12:
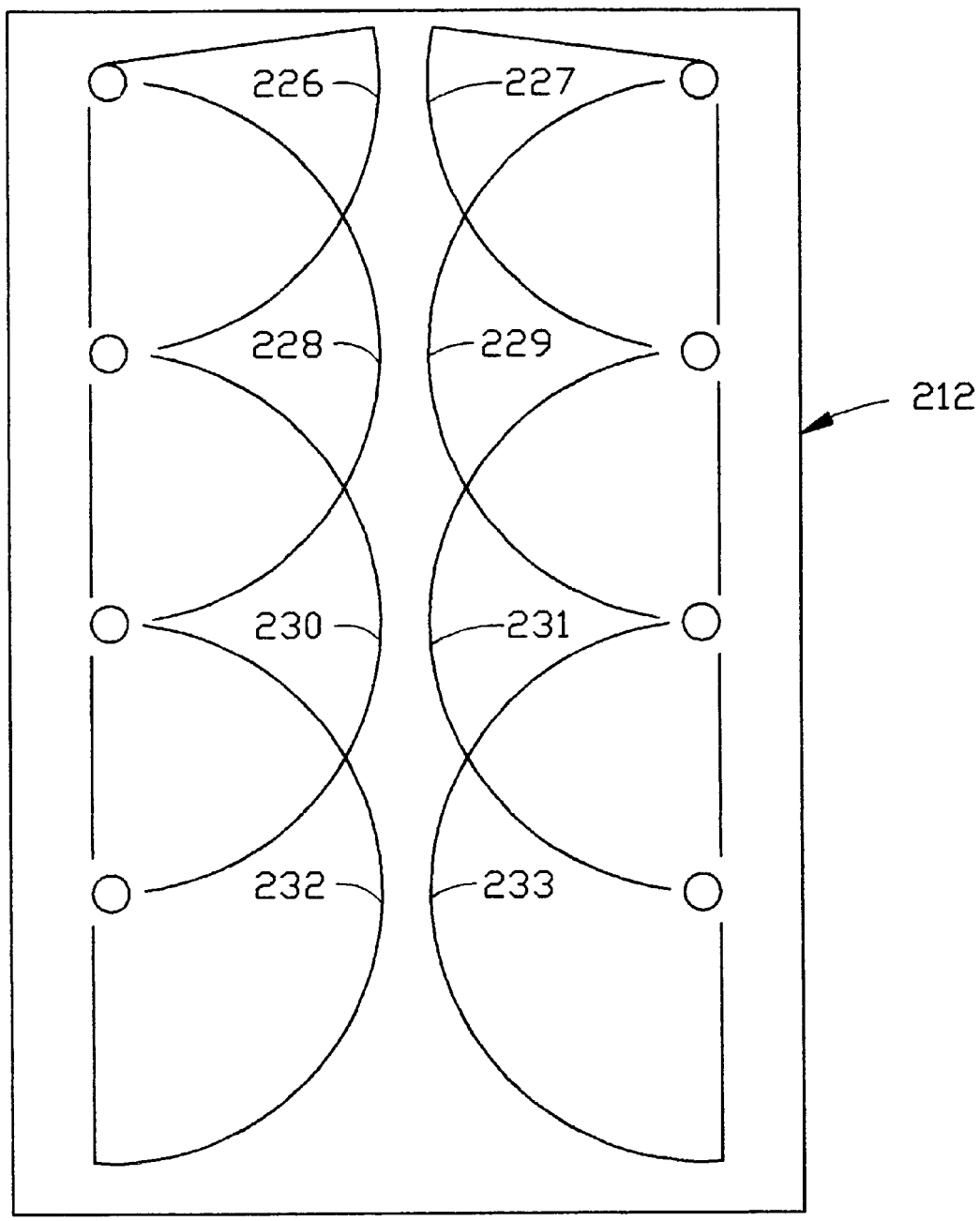
FIG. 12 is a front schematic view of a portion of the apparatus of FIGS. 10 and 11, showing a preferred distribution pattern for a treatment composition that may be obtained by a use of the embodiment of FIGS. 10 and 11.

Apparatus 210, illustrated in FIGS. 10 and 11, is yet another embodiment of the invention that is adapted for attachment to the three point hitch at the rear of a tractor. Apparatus 210 is particularly suited for use in connection with cubical-shaped bales or those having a rectangular cross-section. Typically such bales are considerably smaller than cylindrically-shaped bales, and consequently, apparatus 210 may be used to transport and treat up to four such bales simultaneously.

Apparatus 210 includes frame 212 to which hollow shafts 213, 214, 215, 216, 217, 218, 219 and 220 may be attached in a manner similar to that by which shafts 14, 16 and 18 are attached to frame 12 of apparatus 10. The shafts of apparatus 210 are adapted to be inserted into a bale of hay and to support the bale while apparatus 210 is used to transport it from a storage facility to a pasture for feeding. The shafts also permit distribution of the composition of the invention into the bale while it is being moved. At least one hollow shaft is provided for distribution of the composition into each of the bales. Preferably, at least two shafts are provided for each bale, which shafts are spaced apart in order to provide support for the bale and to achieve an appropriate distribution of composition into the bale. As shown in FIGS. 10 and 11, apparatus 210 includes eight hollow shafts, arranged in pairs 213 and 214, 215 and 216, 217 and 218, and 219 and 220 which pairs are located on opposite sides of frame 212. As has been mentioned, four bales of hay may be treated and transported by apparatus 210. A first bale may be placed on base 225 of frame 212 and pierced by hollow shafts 219 and 220. A second bale may be placed atop the first bale and pierced by hollow shafts 217 and 218. A third bale may be placed atop the second bale and pierced by hollow shafts 215 and 216. A fourth bale may be placed atop the third bale and pierced by hollow shafts 213 and 214.

Frame 212 is preferably comprised of square pipes that are welded together in the configuration shown or in any other suitable arrangement. The frame is preferably adapted to be mounted to the three point hitch of a tractor (not shown) by means of mounting brackets 221, 222 and 224, which are welded into place and provided with holes that are sized appropriately for use in mounting with bolts (also not shown) to support the weight of the apparatus.

Shafts 213, 214, 215, 216, 217, 218, 219 and 220 are preferably provided with tapered ends for ease of insertion into the bale, which ends are blunted to reduce the risk of injuring a cow in the pasture. Since cubical bales are generally considerably smaller than cylindrical bales it is generally not considered necessary for these shafts to be as massive as shafts 14, 16 or 18 of apparatus 10 (or shafts 114, 116, 117 and 118 of apparatus 110). Therefore, although these hollow shafts may be provided in any convenient length and diameter, it is preferred that each of shafts 213, 214, 215, 216, 217, 218, 219 and 220 is about twenty-eight inches long, has a diameter of one-half inch, and is tapered at its outer end. Preferably, these shafts are made from stainless steel and are provided with internal threads (not shown) at the end which is fitted into the frame for attachment of couplings which are provided for attachment of fluid connector hoses.

Each of shafts 213, 214, 215, 216, 217, 218, 219 and 220 is provided with a plurality of holes (not shown) along its length. Preferably, no holes are provided within the first six inches of length of the shaft from the frame, in order to insure that the composition is distributed through the holes so as to be retained in the bale. Otherwise, the holes are spaced so as to achieve the desired pattern for distribution of the composition into a bale. A preferred distribution pattern for apparatus 210, indicated by arc 226 (showing the distribution pattern from shaft 213), arc 227 (showing the distribution pattern from shaft 214), arc 228 (showing the distribution pattern from shaft 215), arc 229 (showing the distribution pattern from shaft 216), arc 230 (showing the distribution pattern from shaft 217), arc 231 (showing the distribution pattern from shaft 218), arc 232 (showing the distribution pattern from shaft 219) and arc 233 (showing the distribution pattern from shaft 220), is illustrated in FIG. 12. As shown therein, the preferred distribution pattern from each of shafts 213, 214, 215, 216, 217, 218, 219 and 220 is generally towards the center of the bale and overlapping that of the adjacent shafts on the same side of frame 212. Preferably, each of these shafts has its holes arranged so as to distribute the liquid composition within the bale of hay in a distribution pattern that is generally bounded by an arc that is centered on the long axis of the shaft, which arc has a length of at least about 135° to about 225°.

It is preferred that the number and size of the holes be designed to accommodate a total flow rate into each bale of no more than five gallons per minute, and preferably about two to about five gallons of composition per minute. Although the rate of flow of composition into each bale will depend on how tightly the hay is baled, a flow rate within the aforementioned range will most likely be achieved, for example, if each of shafts 213, 214, 215, 216, 217, 218, 219 and 220 is provided with at least 10, and preferably 16 holes, each having a diameter of about 1/16 inch.

Reservoir 250 is mounted atop frame 212 and is adapted to hold a suitable quantity, such as thirty gallons, of the composition. Preferably, the reservoir is made from plastic or other suitable material, and is provided with fill cap 252 with a vent (not shown). Reservoir 250 is also preferably mounted within side supports 256 and atop base supports 258 and secured to base supports 258 by straps 260. Reservoir 250 is in fluid communication with pump 262 through a piping 264 that extends from the bottom of the reservoir to the pump. Preferably pump 262 is a power-take-off driven roller pump, which may be attached to the power-take-off of a tractor or other vehicle for power, in a manner known to those having ordinary skill in the art to which the invention relates. In the alternative, the pump may be powered by an electric motor (not shown) or by other known means. The pump may be mounted on the frame or on a tractor or other vehicle by means of bracket 263.

Preferably, flow regulator 266 is provided in piping 264 in order to provide control for the flow of the liquid composition from the reservoir. In addition, it is preferred that reservoir 250 be provided with an internal filter (not shown) to filter the liquid composition passing into piping 264. Pipings 264, 267, 268, 269 and 270, preferably made of rubber or neoprene, are adapted to provide a fluid connection between the reservoir, through pump 262, and the hollow shafts 214, 216, 218 and 220 on one side of frame 212. Pipings 264, 272 and others (not shown) are similarly adapted to provide a fluid connection between the reservoir, through pump 262, and the hollow shafts 213, 215, 217 and 219 on the other side of the frame. By means of this fluid connection, pump 262 is adapted to pump the composition from the reservoir through the hollow shafts for dispersal through the holes along the length thereof.

Apparatus 210 is also preferably provided with check valve 274 that is adapted to prevent flow of the composition into the shafts when the pump is not engaged. In addition, suitable couplings, controls, fittings, seals and drains as are deemed desirable may also be provided in the assembly of apparatus 210.

Any of apparatus 10, apparatus 110 or apparatus 210 (or either apparatus 10 or apparatus 210 and apparatus 110 together) may be employed to practice the method of the invention. First, the liquid composition is provided in the reservoir. Then, the hollow shafts of the apparatus are inserted into a bale or bales of hay, and the pump is actuated to pump the liquid composition from the reservoir through the hollow shafts for dispersal through the holes along the length thereof. This may be accomplished while the bale or bales of hay are being transported from a storage area such as a barn to the pasture where the cows are kept. When the method is practiced by use of an apparatus such as are illustrated herein, it will generally take only about six seconds per hundred pounds of hay to treat or rejuvenate a bale. Thus, it can be appreciated that treatment can readily be accomplished as the hay is transported to the cows. Since the composition contains no caustic ingredients, it can be consumed immediately upon arrival in the pasture.

Although this description contains many specifics, these should not be construed as limiting the scope of the invention but as merely providing illustrations of some of the presently preferred embodiments thereof, as well as the best mode contemplated by the inventor of carrying out the invention. The invention, as described herein, is susceptible to various modifications and adaptations, and the same are intended to be comprehended within the meaning and range of equivalents of the appended claims.

What is claimed is:

1. A method for treating a bale of hay which comprises:
    (a) providing a liquid composition that is essentially free of ammonia, urea and lye and which comprises:
        (1) about 10% to about 50% by volume sweetener;
        (2) about 0.5% to about 8% by volume liquid fat;
        (3) about 0.5% to about 10% by volume gelatin;
        (4) at least about 0.2% by volume phosphoric acid;
        (5) at least about 0.3% by volume elemental calcium;
        (6) at least about 500 IU Vitamin A per gallon of composition;
        (7) at least about 100 IU Vitamin D per gallon of composition; and
        (8) water;
    (b) injecting the composition into the bale of hay.

2. The method of claim 1 which includes providing a composition including about 1% to about 10% by volume condensed cane molasses fermentation solubles and at least about 60% by volume water.

3. The method of claim 1 which includes providing a composition including about 10% to about 50% by volume non-molasses sweetener, at least about 1000 IU Vitamin A per gallon of composition, and about 5% to about 10% by volume chlorophyll.

4. The method of claim 1 which includes injecting the composition into the bale of hay at a rate within the range of about 0.05 to about 0.25 gallons of composition per 100 pounds of hay.

5. The method of claim 1 which includes:
    (a) providing a composition-injecting apparatus having:
        (1) at least one hollow shaft that is adapted for insertion into a bale of hay, said shaft being provided with a plurality of holes along its length;
        (2) a reservoir for containing a quantity of the composition;
        (3) piping for providing a fluid connection between the reservoir and the hollow shaft;
        (4) a pump for pumping the composition from the reservoir through the hollow shaft for dispersal through the holes along the length thereof.

6. The method of claim 5 which includes:
    (a) providing the composition-injecting apparatus as a component of a device that includes a hay hook for holding and supporting a bale of hay, which device is adapted for attachment to a tractor;
    (b) attaching the device to the tractor;
    (c) loading a bale of hay onto the hay hook so that at least one hollow shaft of the composition-injecting apparatus is imbedded in the bale.

7. The method of claim 6 which includes injecting the composition into the bale of hay while transporting the hay with the tractor.

8. A liquid composition for treatment of hay that will improve its nutritional content and render it more palatable to ruminants, said composition being essentially free of ammonia, urea and lye and comprising:
    (a) about 10% to about 50% by volume sweetener;
    (b) about 0.5% to about 8% by volume liquid fat;
    (c) about 0.5% to about 10% by volume gelatin;
    (d) at least about 0.2% by volume phosphoric acid;
    (e) at least about 0.3% by volume elemental calcium;
    (f) at least about 500 IU Vitamin A per gallon of composition;

(g) at least about 100 IU Vitamin D per gallon of composition; and (h) water.

9. The composition of claim 8 which includes about 10% to about 50% by volume non-molasses sweetener, at least about 1000 IU Vitamin A per gallon of composition, and about 5% to about 10% by volume chlorophyll.

10. The composition of claim 8 which includes about 1% to about 10% by volume condensed cane molasses fermentation solubles and at least about 60% by volume water.

11. The composition of claim 10 which comprises:

(a) about 20% by volume sweetener;

(b) about 5% by volume condensed cane molasses fermentation solubles;

(c) about 3% by volume liquid fat;

(d) about 3% by volume gelatin;

(e) at least about 0.2% by volume phosphoric acid;

(f) at least about 0.3% by volume elemental calcium;

(g) at least about 2000 IU Vitamin A per gallon of composition;

(h) at least about 400 IU Vitamin D per gallon of composition;

(i) at least about 60% by volume water.

12. A concentrate that may be mixed with water to form a liquid composition for treatment of hay that will improve its nutritional content and render it more palatable to ruminants, said concentrate being essentially free of ammonia, urea and lye and comprising:

(a) about 30% to about 85% by volume sweetener;

(b) about 1.5% to about 40% by volume liquid fat;

(c) about 1.5% to about 40% by volume gelatin;

(d) at least about 1% by volume phosphoric acid;

(e) at least about 1.5% by volume elemental calcium;

(f) at least about 2500 IU Vitamin A per gallon of concentrate;

(g) at least about 500 IU Vitamin D per gallon of concentrate.

13. The concentrate of claim 12 which includes about 3% to about 35% by volume condensed cane molasses fermentation solubles.

14. The concentrate of claim 12 which includes about 15% to about 40% by volume chlorophyll, about 30% to about 85% by volume non-molasses sweetener, and at least about 4000 IU Vitamin A per gallon of concentrate.

* * * * *